Figure 1:
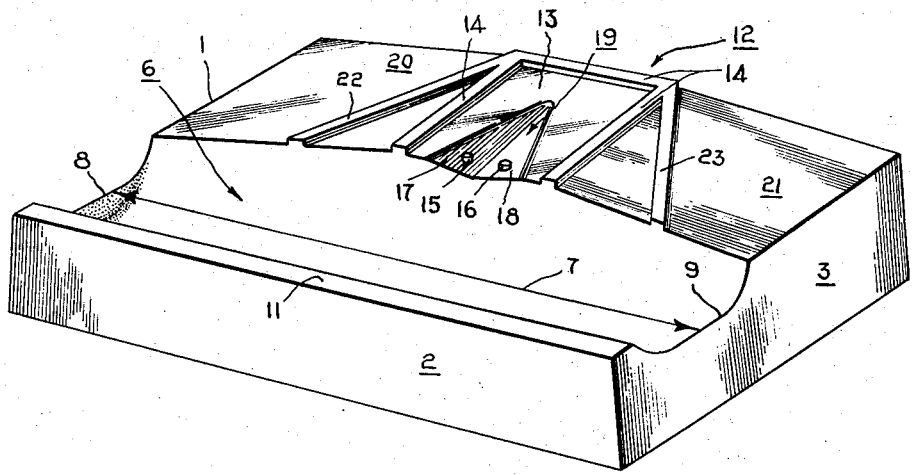

Sept. 15, 1959   D. W. HAY   2,903,997
CORN BUTTERING AND SERVING DISH
Filed Aug. 12, 1958   2 Sheets-Sheet 1

INVENTOR.
DAVID W. HAY
BY
*Dike, Thompson & Bronstein*
ATTORNEYS

Sept. 15, 1959     D. W. HAY     2,903,997
CORN BUTTERING AND SERVING DISH
Filed Aug. 12, 1958     2 Sheets-Sheet 2

INVENTOR.
DAVID W. HAY
BY
Dike, Thompson & Bronstein
ATTORNEYS

United States Patent Office  2,903,997
Patented Sept. 15, 1959

2,903,997
CORN BUTTERING AND SERVING DISH
David W. Hay, Boston, Mass.
Application August 12, 1958, Serial No. 754,556
10 Claims. (Cl. 118—23)

The present invention relates to improved serving and buttering dishes for corn on the cob, and, more particularly, to such dishes which also retain and automatically distribute butter from solid pats and uniquely facilitate the buttering process.

As aids in the convenient and neat service and eating of ears of sweet corn, it has of course been known to provide tined holders, butter spreaders, and shaped open or covered dishes for receiving both the corn and applied melted butter. In the case of the serving dishes themselves, these have been designed in sizes ample enough to envelop the largest ears from end to end, such that, in proportion, somewhat smaller ears which are nevertheless of good quality may appear to be less choice or may not lend themselves to proper immersion in butter collected in the bottom of the server. And, the difficulties often experienced in applying solid butter either with common utensils or by simply depositing it within the server have led to use of separate spreaders, which must then be individually cleaned and stored for re-use, or have led to somewhat troublesome use of pre-melted butter, which is not always considered to be a most appetizing form. Teachings of the present invention are directed to avoidance of such difficulties, and to other improvements in eating practices and service involving ears of corn. In particular, the serving equipment is adapted to receive and retain solid butter, especially butter in commercially available pat form, in position to soften with transmitted heat and to have its flow directed upon the supported ear. Further, the server is designed to confine melted butter to within a portion at which the corn may be readily coated by it, and special provision is made to attractively accommodate ears of varying sizes and to permit their depression into the confined melted butter pool at will. A preferred integral construction is of uncomplicated regular form which may be readily cleaned and also lends itself to economical manufacture with low-cost materials such as may justify disposal after a single use.

Accordingly, it is one of the objects of the present invention to provide simple and improved serving dishes for corn on the cob which will receive and retain solid pats of butter and facilitates the buttering process.

Another object is to provide improved corn serving and buttering dishes of single-piece low-cost construction having surfaces which are readily cleaned and pleasingly accommodating ears of varied sizes.

A further object is to provide a corn dish having a portion for support of commercial pats of butter arranged in communication with a recess for corn to promote an advantageous spreading of butter, and having special resilient end supports for ears which confine the butter to the dish and yet permit depression of corn ears of various sizes into butter collected in the corn recess.

By way of a summary account of practice of this invention in one of its aspects, I provide a molded plastic dish having an elongated recess opening toward the top of the dish and having a concave contour which somewhat complements that of a large ear of corn. Rearward surfaces of the recess rise at the central longitudinal position to meet with the forwardly-sloping surfaces of a small receptacle of about the dimensions of a commercial pat of butter, this receptacle being bordered on the remaining three sides by ridges preventing movement of the pat or flow of melted butter other than into the corn recess. Small upstanding projections from the sloping surfaces of the butter receptacle serve to hold the pat against forward sliding and to raise it from the bottom of the receptacle and ridges on dish surfaces adjacent the butter receptacle guide melted butter overflow toward the corn recess. At each axial end of the corn-receiving recess, there is provided a thin segment-shaped lip of resilient material which projects radially inward to a slight extent and serves to confine melted butter to the recess, to support an ear of corn, and to yield when an ear is pressed against it, such that the kernels may be dipped into melted butter collected within the recess.

Figure 2:
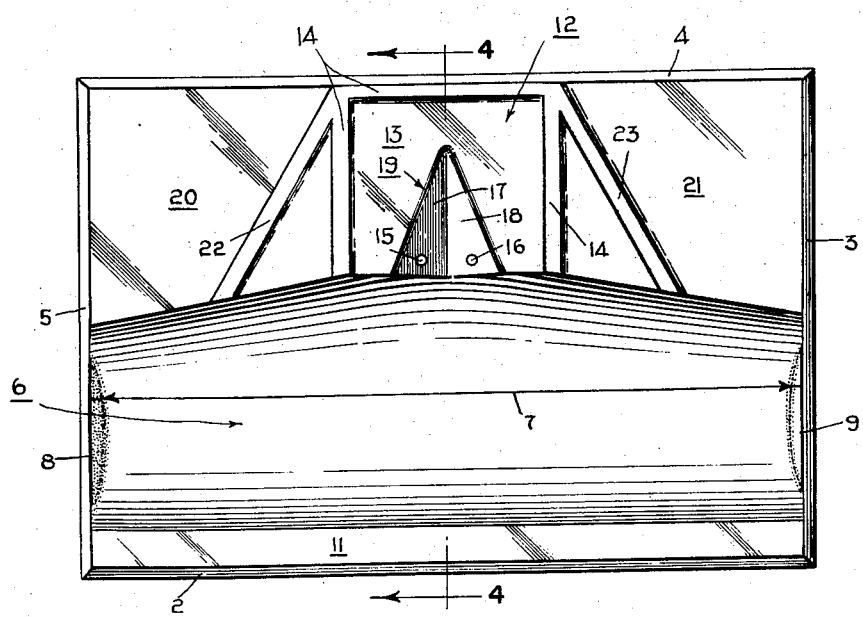
Figure 3:
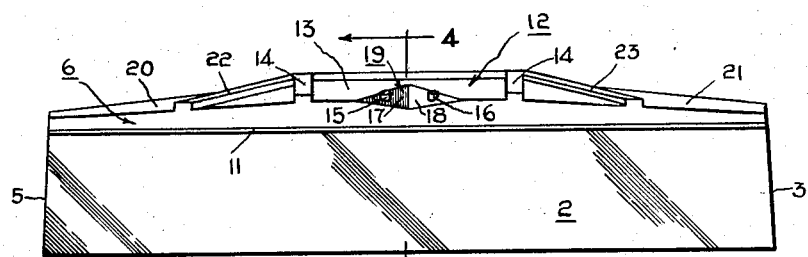
Figure 4:
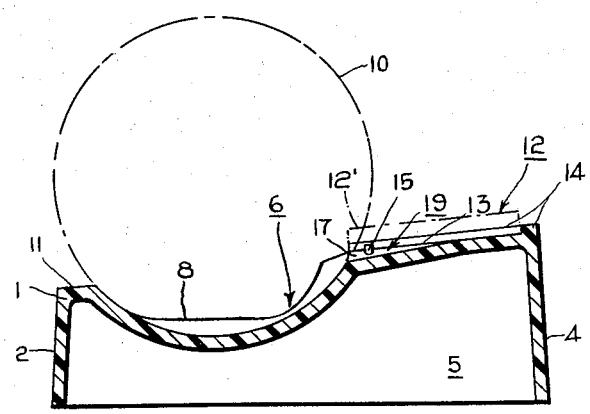

Although the features of this invention which are believed to be novel are set forth in the appended claims, additional details of the invention itself and further objects and advantages thereof may be readily comprehended through reference to the following description taken in connection with the accompanying drawings, wherein:

Figure 1 is a pictorial view, in perspective, of a corn buttering and serving dish which is a preferred embodiment of practice of teachings of this invention;

Figure 2 portrays the same item in a plan view;

Figure 3 presents a front elevation of the preferred buttering and serving dish; and Figure 4 is a cross-sectioned side view of the buttering and serving dish of the preceding figures, taken along section line 4—4 in Figure 3.

Having reference to the illustrations, a preferred unitary buttering and serving article is perceived to be of generally rectangular outline and to be comprised of cooperating portions integrally molded together into one assembly. The interior of the assembly may be solid, filled or vacant, and, in one convenient and economical manufacture, the exterior walls 1 may be relatively thin, as is evident from the Figure 4 cross section. Four upstanding walls 2 through 5 provide a base upon which the assembly may rest upon a table, and the closing upper surfaces are in part contoured to form an elongated open concave depression or recess 6 which extends axially between the side walls 3 and 5. Axial length 7 of this recess is proportioned such that it is not in excess of the length of the shortest ears of corn normally marketed, whereby ears placed within the recess can be expected to rest upon the upstanding resilient lips 8 and 9, discussed hereinafter, and occasionally to project axially outward beyond these lips and the side walls 3 and 5.

Recess 6 possesses a transverse surface contour generally complementing that of corn ears, and, longitudinally, the bottom of this recess is substantially straight and horizontal. In another arrangement, the recess may be slightly arcuate in longitudinal section, in which event it slopes gently upwardly from the middle to lips 8 and 9. The aforesaid contour is readily ascertained through inspection of Figure 4, as are also the facts that the recess 6 is of arcuate shape transversely and that the lips 8 and 9 are shaped somewhat as a circular segment. The substantially circular arc cross-sectioned at the center of the recess is preferably part of a circle of about a 2½ inch diameter characterized by dashed outline 10, which corresponds to the largest expected cross-section of ears of corn. At its widest, the recess does not transversely extend its surfaces arcuately beyond a full semi-circle, whereby full large ears are prevented from locking themselves within the recess. Particularly attractive display of the corn served upon the dish is promoted by having the horizontal front edge surface 11 at a low level in relation to the back surfaces of the dish, such that corn is generously exposed toward the diner.

At the most elevated portion of the assembly, and centrally and rearwardly of the recess 6, there is provided a special form of butter receptacle, 12, having a forwardly-sloping bottom surface 13 which at its forward end merges with the rear upper edge surface of recess 6, and which is bordered on its other three sides by upstanding ridges 14. From rear to front, the surface 13 extends somewhat less than 1½ inches, which is the width of square commercial pats of butter, although the surface 13 extends from side to side between ridges 14 slightly more than this distance. When positioned within the receptacle, the upper front corner of a solid pat then projects slightly forward beyond the receptacle, as represented by the dashed-line outline 12' in Figure 4, and an ear of corn may be at least initially prepared by rotating it against the exposed edge of the butter.

Heat transmitted from the hot ear through the dish and butter occasions melting of the butter, which then advantageously tends to gravitate forward onto the ear and into the recess. This action also tends to promote sliding of the solid pat of butter into the recess, when the corn has been withdrawn, except that the two upward projections 15 and 16 engage the underside of the pat and prevent its sliding forward upon a film of melted butter. These projections are preferably of heights sufficient to raise the forward under surface of a pat above the forward surface of the butter receptacle, and they each project upwardly from a different one of the forwardly and centrally sloping surfaces 17 and 18 of a central triangular groove 19. Melted butter thus tends to gravitate forward through shallow groove 19 without collecting under the butter pat where it would cause it to become dislodged from the butter receptacle.

Lateral rear surfaces 20 and 21, which slope downwardly from the butter receptacle to the side walls 5 and 3, respectively, also preferably have a slight forward slope. These surfaces, in cooperation with the ridges 22 and 23 which project forward along these surfaces at an angle with the merging rear ridge 14 of receptacle 12, tend to channel melted butter overflow into the recess 6 and onto the corn being served therefrom.

The bottom of corn-receiving recess 6 is preferably straight and horizontal in the longitudinal direction, such that a pool of melted butter collected there extends across the entire length of the bottom of the recess. It may be desirable that the supported corn have different portions of varied shapes dipped into this pool as they are about to be consumed, but that they not necessarily remain immersed in it when the corn is rested within the recess. This is facilitated by the generally segment-shaped ribs or lips 8 and 9 upon which the ear rests and which are of thinness and resiliency permitting them to be deformed and, thereby, permitting the corn to be depressed further into the melted butter when downward pressure is exerted. An ear of corn may be shifted longitudinally to permit various portions to be immersed, and the lips will further provide a wiping action for removal of excess liquid butter. Needed resiliency is obtained when the entire assembly is molded of material such as polyethylene. Alternatively, such resilient lips may be separately added to a more rigid assembly, such as one made of wood or china. Further materials of which the assembly may be constructed may include cellulose acetate, ethyl cellulose, polyvinyl chloride, polystyrene, nylon, or papier-mache of the type used in forming paper plates. In the latter instance, the unit is very desirably of particularly inexpensive construction and may be disposable after one use, and surface protection with plastics or foil serves to prevent undue absorption of liquid butter.

It should be apparent that the preferred embodiment is susceptible of modification, as by provision of grooves rather than ridges 22 and 23 to channel overflow into the recess. And, the effects of ridges 14 may also be realized by lowering the butter receptacle bottom surface 13 in relation to the upper edges of sloping surfaces 20 and 21. Thus, it will be understood that the disclosures of a preferred embodiment herein are of a descriptive rather than a limiting nature and that various changes, combinations, substitutions, or modifications may be introduced in accordance with these teachings without departing in spirit or scope from this invention in its broader aspects.

What I claim as new and desire to secure by Letters Patent of the United States is:

1. An article for the serving and buttering of corn comprising a dish having an elongated open recess with concave surfaces contoured to accommodate an ear of corn, a receptacle for a solid pat of butter formed in said dish laterally adjacent said recess at an elevated position in relation to the bottom of said recess and having a lower butter-supporting surface meeting with an upper edge of said recess, said lower surface communicating with at least one groove extending downwardly beneath the level of said surface and sloping downwardly toward an upper edge of said recess, whereby melted butter gravitates from said receptacle toward said recess through said groove, said receptacle being opened along said upper edge of said recess to permit butter therein to be exposed to an ear of corn in said recess, and said receptacle being rimmed about the remainder of its periphery to hold a pat of butter therein.

2. An article for the serving and buttering of corn comprising a dish having an elongated open recess with concave surfaces contoured to accommodate an ear of corn, a receptacle for a solid pat of butter formed in said dish laterally adjacent said recess at an elevated position in relation to the bottom of said recess and having a lower butter-supporting surface slightly inclined downward toward and meeting with an upper edge of said recess, at least one vertically-extending projection from said lower surface near said edge proportioned to engage and hold a pat of butter from the under side thereof and to maintain said pat out of contact with said lower surface near said edge, and said receptacle being opened along said edge and rimmed about the remainder of its periphery, whereby said receptacle directs flow of melted butter downwardly toward and into said recess.

3. An article for the serving and buttering of corn comprising an integral dish assembly having an elongated open recess with concave surfaces contoured to accommodate an ear of corn, a rectangularly-shaped receptacle for a solid pat of butter formed in said dish laterally adjacent said recess in a longitudinally central relationship to said recess at an elevated position in relation to the bottom of said recess, said receptacle including a lower butter-supporting surface meeting with an upper edge of said recess, means forming at least one groove communicating with said lower surface and extending downwardly beneath said lower surface toward said upper edge of said recess, at least one vertically-extending projection from the lower part of said receptacle near said edge proportioned to engage and hold a pat of butter from the under side thereof and to maintain said pat out of contact with said lower surface near said edge, said receptacle being opened at the side along said edge, and ridge means formed in said dish about the remaining sides of said receptacle, whereby said receptacle directs flow of melted butter downwardly toward and into said recess.

4. An article as set forth in claim 3 further comprising a pair of surfaces formed in said dish and each sloping laterally downward from a different side of said receptacle in direction substantially parallel with said elongated recess, and channelling means inclined along each of said pair of surfaces communicating between said receptacle and said recess to direct melted butter overflow from said receptacle into said recess.

5. An article as set forth in claim 3 wherein said rectangularly-shaped receptacle is proportioned to extend from said side along said edge to the opposite parallel side for a distance less than the width of a commercial pat of butter and to extend transversely for a distance exceeding said width.

6. An article as set forth in claim 3 wherein said open recess is arcuate in cross section transverse to the direction of elongation thereof and wherein the surfaces thereof extend arcuately for less than a semicircle.

7. An article for the serving and buttering of corn comprising a dish having an elongated open recess with concave surfaces contoured to accommodate an ear of corn, said recess terminating at opposite ends of said dish in surfaces which are arcuate in cross section transverse to the direction of elongation of said recess, a receptacle for a solid pat of butter formed in said dish laterally adjacent said recess at a position elevated in relation to the bottom of said recess and having a lower surface sloping downward toward and meeting with an upper edge of said recess, said receptacle being opened along said edge and closed about the remainder of its periphery, whereby said receptacle directs flow of melted butter downwardly toward and into said recess, and resilient lip means extending radially inward from the bottom portions of said arcuate recess surfaces near said ends of said recess.

8. An article for the serving and buttering of corn comprising a dish formed of resilient material and having an elongated open recess with concave surfaces contoured to accommodate an ear of corn, said recess throughout having arcuate cross sections transverse to the direction of elongation thereof, a pair of thin lips each having generally the shape of a segment of a circle extending radially inward about said arcuate recess surfaces one near each axial end of said recess, said lips each being integral with said dish, said recess and lips extending arcuately less than a semicircle, a receptacle for a solid pat of butter formed in said dish laterally adjacent said recess at a position elevated in relation to the bottom of said recess and having a lower surface sloping downward toward and meeting with an upper edge of said recess, said receptacle being opened along said edge and closed about the remainder of its periphery, whereby said receptacle directs flow of melted butter downwardly toward and into said recess.

9. An article for the serving and buttering of corn comprising an integral dish assembly molded of resilient material and having an elongated open recess with concave surfaces contoured to complement the shape of part of a large ear of corn, said recess having an arcuate cross-section throughout transverse to the direction of elongation thereof, and having a bottom surface extending substantially straight and horizontal in said direction of elongation, thin lips each having generally the shape of a segment of a circle projecting radially inward from said recess at each of the opposite axial ends thereof, said recess and lips extending arcuately less than a semicircle and said lips extending arcuately less than said recess at said ends, a rectangularly-shaped receptacle for a solid pat of butter formed in said dish laterally adjacent said recess in a longitudinally central relationship to said recess at a position elevated in relation to the bottom of said recess, said receptacle including a lower butter-supporting surface meeting with an upper edge of said recess, means forming at least one groove communicating with said lower surface and extending downwardly beneath said lower surface toward an upper edge of said recess, at least one vertically-extending projection from the lower part of said receptacle near said edge proportioned to engage and hold a pat of butter from the under side thereof and to maintain said pat out of contact with said lower surface near said edge, said receptacle being opened at the side along said edge, ridge means formed in said dish about the remaining sides of said receptacle, said receptacle being proportioned to extend from said side along said edge to the opposite parallel ridge for a distance less than the width of a commercial pat of butter and to extend transversely for a distance exceeding said width, a pair of surfaces formed in said dish each sloping laterally downward from a different side of said receptacle in direction substantially parallel with said elongated recess, and channelling means inclined along each of said pair of surfaces communicating between said opposite ridge of said receptacle and said recess to direct melted butter overflow from said receptacle into said recess.

10. An article as set forth in claim 9 wherein said material comprises in a papier-mache substance coated with liquid-proof material on at least one side thereof.

References Cited in the file of this patent

UNITED STATES PATENTS

| | | |
|---|---|---|
| 1,467,835 | Buhse | Sept. 11, 1923 |
| 2,028,435 | Burns | Jan. 21, 1936 |